United States Patent [19]
Ninke et al.

[11] 3,885,142
[45] May 20, 1975

[54] BINARY RATE MULTIPLIERS

[75] Inventors: William Herbert Ninke, Holmdel; George Ray Ritchie, Freehold, both of N.J.

[73] Assignee: Bell Telephone Laboratories, Incorporated, Murray Hill, N.J.

[22] Filed: May 15, 1974

[21] Appl. No.: 470,220

[52] U.S. Cl. .............. 235/164; 235/150.3
[51] Int. Cl. .............. G06f 7/52
[58] Field of Search .............. 235/150.3, 156, 164; 307/225; 328/37, 39, 51, 156, 158

[56] References Cited

UNITED STATES PATENTS

| | | | |
|---|---|---|---|
| 3,414,720 | 12/1968 | Battarel | 235/164 |
| 3,474,236 | 10/1969 | Batte | 235/164 X |
| 3,764,784 | 10/1973 | Haner et al. | 235/150.3 |

*Primary Examiner*—Eugene G. Botz
*Assistant Examiner*—Jerry Smith
*Attorney, Agent, or Firm*—Ronald D. Slusky

[57] ABSTRACT

An output binary rate vector is provided in response to a selected input number by generating a plurality of individual binary rate vectors substantially concurrently. Each of the individual vectors is generated in response to a different predetermined group of distinct adjacent bits of the input binary number. The individual vectors are generated by respective binary rate multiplier circuits, each of which includes a shift register and gating circuitry. The output binary rate vector is provided by serially extending the bits of the several individual vectors to an output terminal in a predetermined sequence.

19 Claims, 5 Drawing Figures

BINARY RATE MULTIPLIERS

BACKGROUND OF THE INVENTION

The present invention relates generally to digital circuits and in particular, to binary rate multipliers.

A binary rate multiplier (BRM) is a specialized type of digital circuit used in a wide variety of applications including, for example, data processing and industrial machine control. The input to the BRM is a binary number. The output thereof is a "binary rate" vector which is typically provided in serial form. In a binary rate vector, the number of bits having the value 1 corresponds to the value of the input number, with the 1 bits fairly uniformly distributed within the vector. Thus, if the input to a 16-bit BRM is 0111, i.e., decimal seven, the vector generated thereby is 0101010101010100.

One known type of binary rate multiplier, herein referred to as a "counter-type" BRM, comprises a binary counter and a decoding circuit. The decoding circuit may include Boolean logic elements, for example, and operates in response to the counter output and the binary input number to serially generate the bits of the corresponding binary rate vector. A principal disadvantage of this type of binary rate multiplier is that the counter must operate at the output bit rate, and the ripple delay in the counter may undesirably limit the maximum bit rate.

SUMMARY OF THE INVENTION

Accordingly, a general object of the present invention is to provide an improved binary rate mutliplier.

Another general object of the invention is to provide an improved method for generating binary rate vectors.

A more specific object of the invention is to provide a binary rate multiplier which is capable of operating at high bit rates.

Another specific object of the invention is to provide a binary rate multiplier which is amenable to economical fabrication in integrated circuit form.

These and other objects may be achieved by constructing a binary rate multiplier which concurrently generates the bits of the binary rate vector in parallel form and thereafter extends them to the BRM output terminal in serial form. This type of arrangement may include, for example, a gating circuit and a shift register and is herein referred to as a "shift register" BRM. The gating circuit operates in response to the input number to generate the vector in parallel form, and thereafter loads it in that form into the shift register. The bits of the vector are then serially shifted from the shift register at the desired bit rate.

In shift register BRMs, the entire vector is generated and stored in the BRM as soon as the input number is applied thereto. Thus advantageously, the input numer need only be applied to a shift register BRM momentarily. If this mode of operation is desired in a counter-type BRM, by contrast, additional storage circuitry is required. In addition, shift register BRMs are more amenable to implementation via dynamic transfer cells than are, for example, counter-type BRMs. This reduces the size and cost of fabricating the BRM in integrated circuit form.

A major drawback of shift register BRMs, however, is that the length of the register doubles for each bit added to the input number. As a result, shift register BRMs capable of handling input numbers of more than four or five bits are not particularly attractive from a manufacturing cost standpoint.

Accordingly, a further object of the invention is to provide a binary rate multiplier which utilizes relatively little circuitry.

A binary rate multiplier achieving these and other objects in accordance with our invention operates in response to a selected binary input number to generate substantially concurrently a hierarchy of individual binary rate vectors in parallel form. Each of the individual vectors is referred to herein as a "BRM unit vector" and is generated in response to a different predetermined group of distinct adjacent bits of the input number. The position of each BRM unit vector in the hierarchy corresponds to the positional significance in the input number of the bit group in response to which the particular BRM unit vector is generated.

The output binary rate vector corresponding to the selected input number is then generated by serially extending the bits of the several BRM unit vectors to an output circuit in a predetermined sequence. The sequence is such that each bit of each BRM unit vector is interposed substantially halfway between successive repetitions of the next higher order BRM unit vector.

An illustrative embodiment of a binary rate multiplier in accordance with the invention comprises a plurality of individual shift register binary rate multipliers, each referred to herein as a "BRM unit." Each of the input number bit groups is applied to a different one of the BRM units so that each BRM unit vector is loaded in parallel form into one of the BRM unit shift registers.

The output binary rate vector is generated by applying shift pulses to the several BRM units such that the BRM unit vector bits are provided to an output gate in accordance with the above-described predetermined output bit sequence. The shift registers of the several BRM units are adapted to recirculate the bits of the unit vectors respectively stored therein inasmuch as the bits of each BRM unit vector (except the lowest order vector of the hierarchy) are repetitively extended to the output gate during generation of the output vector.

Advantageously, a binary rate multiplier comprising a plurality of BRM Units arranged in accordance with the invention as described above requires far fewer shift register stages than would a single shift register BRM of like capability. In the illustrative embodiment disclosed herein, for example, the binary input number comprises six bits and requires a total of nine shift register stages. By contrast, a BRM using a single shift register for receiving six-bit input numbers would require sixty-four shift register stages.

BRIEF DESCRIPTION OF THE DRAWING

The invention may be clearly understood from a consideration of the following detailed description and accompanying drawing, in which.

DETAILED DESCRIPTION

Figure 1:
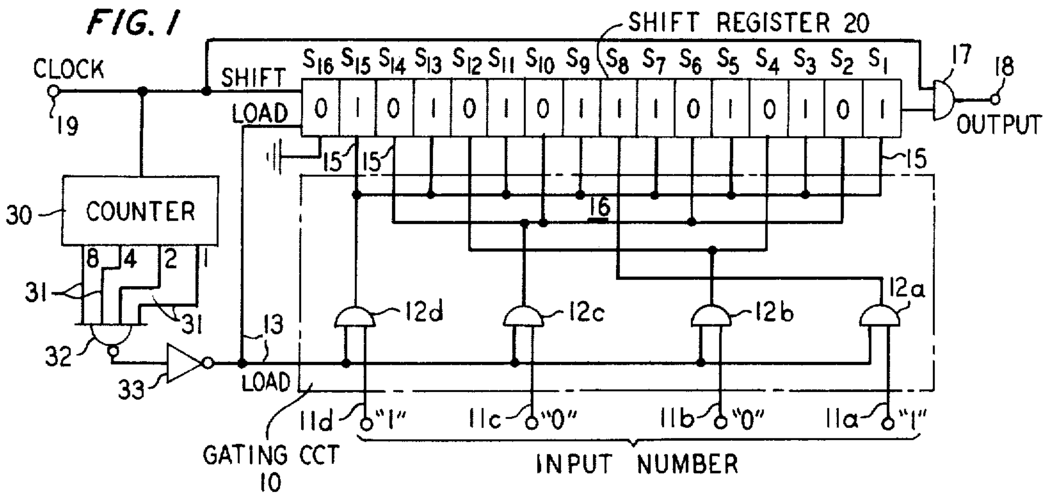
FIG. 1 is a circuit diagram showing a shift register binary rate multiplier.

The shift register binary rate multiplier (BRM) in FIG. 1 comprises a gating circuit 10 and shift register 20, the latter having sixteen stages $S_1$ through $S_{16}$. Gating circuit 10 generates a binary rate vector corresponding to a four-bit binary input number provided on leads 11*a*, 11*b*, 11*c* and 11*d*. The bits of the vector generated by gating circuit 10 are concurrently loaded into respective stages of shift register 20 via leads 15. A sequence of sixteen shift pulses then serially shifts the vector bits from register 20 to output terminal 18.

Gating circuit 10 illustratively comprises two-input AND gates 12*a*, 12*b*, 12*c* and 12*d* each responsive to an input number bit on a respective one of leads 11*a*...11*d*. When a pulse is provided on LOAD lead 13, each of gates 12*a*...12*d* is enabled, and the bits of the input number are extended therethrough to wiring matrix 16. The latter distributes the input number bits such that a binary rate vector corresponding to the selected input number is provided on leads 15. Illustratively, the pulse on LOAD lead 13 is also extended to the LOAD input of register 20 to load the vector bits on leads 15 into register 20.

As mentioned above, the number of 1 bits in a binary rate vector corresponds to the value of the input number provided to the BRM, with the 1 bits fairly uniformly distributed within the vector. Thus the least significant input number bit appearing on lead 11*a*, which bit repesents the 1's place of the input number, is extended by wiring matrix 16 from the output of gate 12*a* to the single shift register stages $S_8$. The next more significant bit on lead 11*b*, which represents the 2s place of the input number, is extended from the output of gate 12*b* to the two shift register stages $S_4$ and $S_{12}$. Similarly, the bit on lead 11*c*, which represents the 4s place of the input number, is extended from the output of gate 12*c* to the four shift register stages $S_2$, $S_6$, $S_{10}$ and $S_{14}$. And finally, the most significant bit on lead 11d, which represents the 8 's place of the input number, is extended from the output of gate 12*d* to the eight stages $S_1$ , $S_3$, $S_5$, $S_7$, $S_9$, $S_{11}$, $S_{13}$ and $S_{15}$.

Since the input number provided to the illustrative shift register BRM of FIG. 1 has four bits, the maximum number of 1s that can be present in the binary rate vector generated by the BRM of FIG. 1 is fifteen. Register 20 illustratively comprises sixteen stages, however, so that the number of bits of the vector generated by the BRM will be a power of 2, and will thus have a standard bit length. No bit is ever loaded by wiring matrix 16 into stage $S_{16}$ of register 20. Rather the input to stage $S_{16}$ is illustratively connected to ground so that, assuming a positive logic system, the sixteenth bit of the vector loaded into register 20 is always 0. In FIG. 1, the input number illustratively depicted on leads 11*a*...11*d* is 1001, i.e. decimal nine. Thus the binary rate vector loaded into register 20 by a signal on LOAD lead 13 is 0101010111010101.

If desired, the AND gate and wiring matrix arrangement of gating circuit 10 can be replaced by other arrangements, such as a read-only memory (ROM). In a shift register binary rate multiplier including an ROM, the input number is applied to the address inputs of the ROM. The corresponding binary rate vector, previously stored in the memory, is then provided in parallel form to the shift register.

Figure 2:
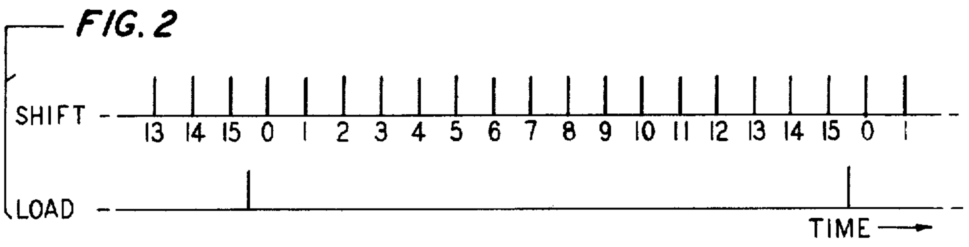
FIG. 2 is a time chart showing a sequence of clock and load pulses for the circuit of FIG. 1.

The time chart of FIG. 2 shows a sequence of shift and load pulses for the binary rate multiplier of FIG. 1. After a pulse is applied to LOAD lead 13, sixteen shift pulses, which in FIG. 2 are numbered 0 through 15, are concurrently applied to the SHIFT lead of register 20 and to output AND gate 17, thereby serially extending to output terminal 18 the vector bits loaded into register 20 by the pulse on LOAD lead 13. The shift pulses are provided directly from a clock signal applied to terminal 19. The load pulses are provided by a four-stage binary counter 30 which advances one count for each clock pulse. Whenever the binary signal on the four output leads 31 of counter 30 is 1111, a signal is extended through NAND gate 32 and inverter 33 to LOAD lead 13. A time delay principally comprising the ripple delay in counter 30 assures that no load pulse is generated until after the sixteenth shift pulse has been applied to register 20, and thus the final bit of the vector therein shifted to output terminal 18. In an alternative arrangement in which stage $S_{16}$ may be eliminated, shift pulse 15 is omitted, and pulses are applied to LOAD lead 13 at the time when shift pulse 15 would have occurred.

As discussed in detail hereinabove, shift register BRMs provide several advantages over other types of binary rate multipliers, such as the known, countertype BRM. A major drawback of shift register binary rate multipliers, however, is that the number of register stages doubles for each bit added to the input number. Accordingly, shift register BRMs capable of handling input numbers of more than four or five bits are not particularly attractive from a manufacturing cost standpoint.

Advantageously, the binary rate multiplier of the present invention, obviates this drawback of shift register BRMs of the type shown in FIG. 1 while generally preserving the advantages thereof. More particularly, reference is made to FIG. 3, which depicts a binary rate multiplier 50 embodying the principles of the present invention. Binary rate multiplier 50 receives a binary input number of illustrative six-bit length on input leads 51*a*...51*f*, and provides a corresponding sixty-four bit binary rate vector at output terminal 54.

Multiplier 50 illustratively comprises three distinct BRM units 60, 70 and 80. Each BRM unit comprises a shift register binary rate multiplier, illustratively of the type shown in FIG. 1. Thus BRM units 60, 70 and 80 respectively include AND gates 62, 72 and 82, wiring matrices 66, 76 and 86, and shift registers 65, 75 and 85. Shift pulses for registers 65, 75 and 85 are provided on SHIFT leads SL1, SL2 and SL3, respectively. Registers 65, 75 and 85 each comprise three shift register stages - a total of nine for binary rate multiplier 50. By contrast, a single shift register BRM adapted to receive six-bit input numbers requires sixty-four stages. The saving in circuitry provided by the present invention is thus apparent, and is even more significant for input numbers having more than six bits.

BRM units 60, 70 and 80 further respectively include output AND gates 68, 78 and 88. The output AND gate of each BRM unit operates in response to pulses applied to the SHIFT lead of that unit to extend the bit in the rightmost stage of the unit to OR gate 56 and thence to output terminal 54. As will be described in detail hereinafter, shift pulses are applied to only one BRM unit at a time. Thus AND gates 68, 78 and 88 assure that only one bit at a time is extended to output terminal 54. Registers 65, 75 and 85 illustratively operate in response to the trailing edge of the shift pulses respectively applied thereto. Thus when one of gates 68, 78 and 88 is enabled by a shift pulse, the bit to be thereafter extended to output terminal 54 is assured to have been fully shifted or loaded into the rightmost stage of the corresponding register.

Figure 3:
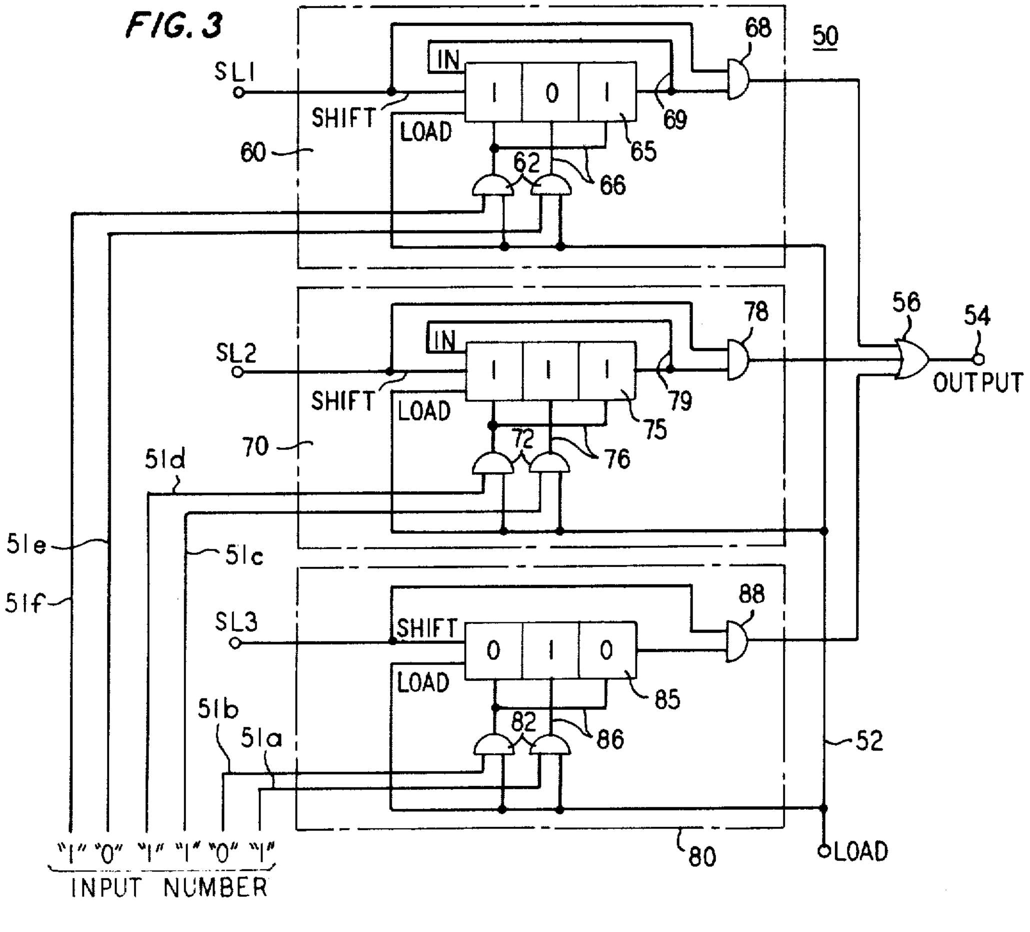
FIG. 3 is a circuit diagram showing an illustrative binary rate multiplier embodying the principles of our invention.

The six-bit input number provided to multiplier 50 on leads 51*a*...51*f* is divided into a plurality of adjacent bit groups - illustratively three groups of two bits each. In FIG. 3, the input number is assumed for purposes of example to be 101101, i.e., decimal forty-five. The most significant input bit group, 10, provided on leads 51*f* and 51*e*, is applied to BRM unit 60. Similarly, next most significant bit group, 11, provided on leads 51*d* and 51*c*, is applied to BRM unit 70, while the least significant bit group, 01, provided on leads 51*b* and 51*a*, is applied to BRM unit 80. The several bit groups are treated as though each were a complete and independent input number. Thus when a load pulse is applied to each BRM unit concurrently via LOAD lead 52, three binary rate vectors 101, 111 and 010, herein referred to as "BRM unit vectors," are concurrently generated in parallel form and stored in BRM units 60, 70 and 80, respectively.

Figure 4:
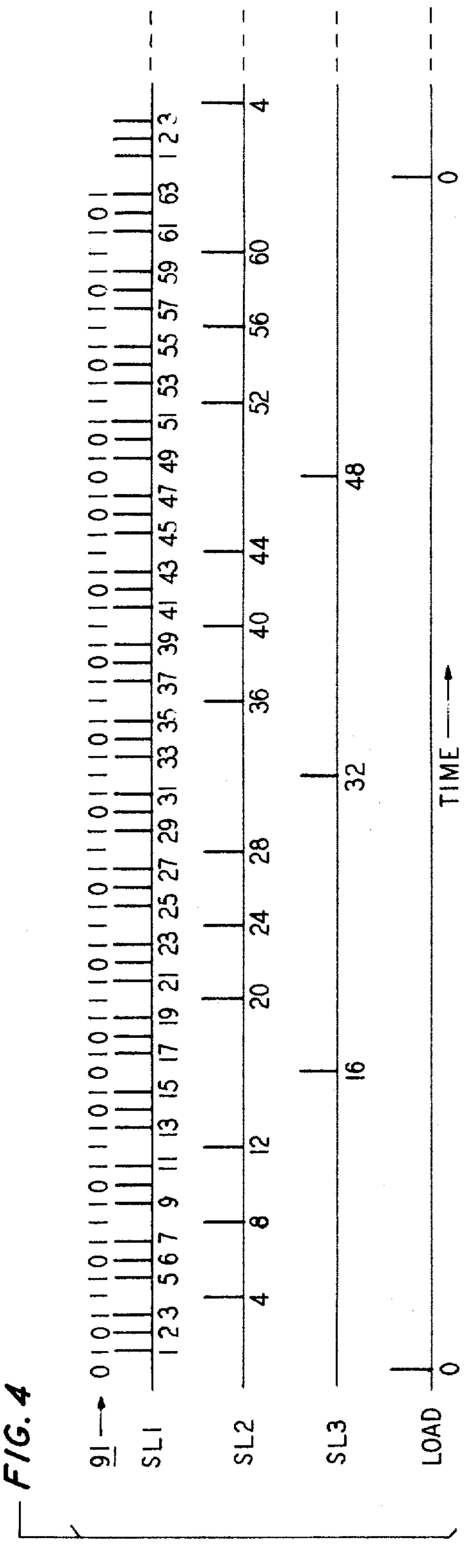
FIG. 4 is a time chart showing a sequence of clock and load pulses for the circuit of FIG. 3.

The sixty-four bit binary rate vector provided at output terminal 54 for the six-bit input number is indicated by the reference numeral 91 in FIG. 4. Since the input number on leads 51*a*...51*f* is illustratively 101101, vector 91 has forty-five fairly uniformly spaced 1s. Vector 91 is generated by a sequence of sixty-four pulses, numbered 0 through 63 in FIG. 4. Pulse 0 is a load pulse applied to LOAD lead 52. Pulses 1 through 63 are shift pulses, each of which is applied to a predetermined one of the three BRM unit SHIFT leads SL1, SL2 and SL3 in a manner described hereinafter. Since pulse 0 does not shift any BRM unit vector bits to output terminal 54, a 0 appears at output terminal 54 during this pulse. A standard, sixty-four bit length is thus provided for vector 91. This 0 may be regarded as the last bit of a vector just generated or the first bit of the vector about to be generated, depending upon the particular system in which binary rate multiplier 50 operates. In FIG. 4, each bit of vector 91 is shown directly above a corresponding one of pulses 0 through 63.

The three BRM unit vectors 101, 111 and 010 are arranged in a hierarchy. The position of each BRM unit vector in the hierarchy corresponds to the positional significance in the input number of the bit group in response to which the vector is generated. Thus in the illustrative embodiment, vector 101 in BRM unit 60, which is generated in response to the group comprising the most significant bits of the input number, is the highest order vector of the hierarchy. Vectors 111 and 010 are the second and lowest order vectors of the hierarchy, respectively.

The sixty-three shift pulses 1 through 63 are distributed among SHIFT leads SL1, SL2 and SL3 such that the bits of BRM unit vectors 101, 111 and 010 are extended to OR gate 56 and thence to output terminal 54 in an output bit sequence in which each bit from each BRM unit vector is interposed substantially halfway between successive repetitions of the entire next higher order vector. Successive repetitions of BRM unit vector 101, for example, are provided by circuitry including a lead 69 connecting the rightmost stage of register 65 to the leftmost stage thereof. Thus when pulses are applied to SHIFT lead SL1 to extend the bits of vector 101 to OR gate 56, those bits are also recirculated within register 65. Vector 101 can thus be repetitively extended to OR gate 56 in response to subsequent pulses on SHIFT lead SL1. BRM unit 70 similarly includes a lead 79 which enables recirculation of vector 111 in shift register 75 as the bits thereof are repetitively extended to OR gate 56.

No recirculation lead is provided for register 85 in BRM unit 80 since, as explained below, each bit of vector 010 is extended to OR gate 56 and thence to output terminal 54 only once during a sixty-four pulse BRM cycle. However, a recirculation lead could be provided for BRM unit 80 if, in a given application, it were desired to generate the identical output vector for a plurality of successive BRM cycles, or if it were desired to minimize manufacturing, inventory and/or maintenance costs by making BRM unit 80 substantially identical to BRM units 60 and 70.

As seen in FIG. 4, shift pulses 16, 32 and 48 are applied to shift lead SL3 to extend each bit of the lowest order BRM unit vector, i.e., vector 010, to output terminal 54. Pulses 4, 8 and 12, 20, 24 and 28, 36, 40 and 44 and 52, 56 and 60 are applied to shift lead SL2 to repetitively extened vector 111 to output terminal 54. Pulses 16, 32 and 48 occur substantially halfway between pulses 12 and 20, 28 and 36 and 44 and 52, respectively. Thus it is seen that each bit of vector 010 is interposed in the output bit sequence comprising output vector 91 substantially halfway between successive repetitions of the entire next higher order BRM unit vector, i.e., vector 111.

Pulses 1, 2 and 3, 5, 6 and 7, 9, 10 and 11, etc. are applied to shift lead SL1. Pulses 4, 8, 12, 20 etc. on lead SL2 occur substantially halfway between pulses 3 and 5, 7 and 9, 11 and 13, 19 and 21, etc., respectively. Thus it is seen that each bit of vector 010 is interposed in the output bit sequence comprising vector 91 substantially halfway between successive repetitions of the entire next higher order BRM unit vector, i.e., vector 101.

Figure 5:
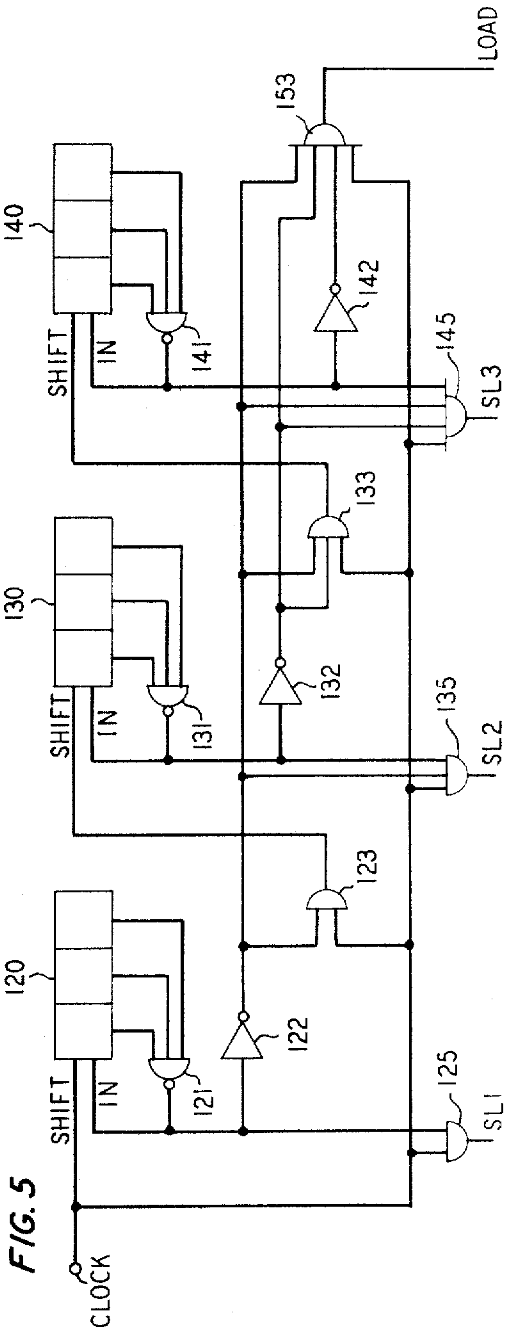
FIG. 5 is a circuit diagram showing an illustrative circuit for generating the clock and load pulse sequence of FIG. 4.

The clock and load pulse sequence of FIG. 4 can be generated by any known arrangement. One illustrative arrangement is the circuit of FIG. 5, which comprises three-stage shift registers 120, 130 and 140. Shift pulses for register 120 are taken from a clock signal, the pulses of which recur at the desired output bit rate for binary rate multiplier 50 of FIG.. 3. The contents of the three stages of register 120 are combined in NAND gate 121. The output of NAND gate 121 is fed back to the leftmost stage of register 120. Thus for each group of four successive clock pulses, four successive bit sequences 011, 101, 110 and 111 are automatically generated and stored in register 120. The output of gate 121, which thus remains 1 through three successive clock pulses and becomes 0 during the fourth, is combined in AND gate 125 with the clock signal. Thus three out of every four clock pulses are passed through gate 125, thereby generating the signal on SHIFT lead SL1 shown in FIG. 4.

The output of gate 121 is also extended to AND gate 123 via inverter 122. The clock signal is also provided to gate 123. The one out of every four clock pulses which, as described above, does not cause a pulse to be generated on SHIFT lead SL1, e.g., pulse 4 in FIG. 4, does, however, enable gate 123 to pass a pulse through to the SHIFT input of register 130.

The configuration about register 130 includes NAND gate 131, and is similar to that about register 120. Thus the output of NAND gate 131 remains 1 through three successive register 130 shift pulses and becomes 0 during the fourth. The output of gate 131 is combined in AND gate 135 with the output of inverter 122 and the clock signal to generate the signal on SHIFT lead SL2 shown in FIG. .4.

The output of NAND gate 131 is also extended to AND gate 133 via inverter 132. The clock signal and the output of inverter 122 are both also extended to gate 133. Thus a clock pulse which does not cause a pulse to be generated on either of SHIFT leads SL1 or SL2, e.g., pulse 16 in FIG. 4, does, however, enable gate 133 to pass a pulse through to the SHIFT input of register 140.

The configuration about register 140 includes NAND gate 141 and is similar to that about registers 120 and 130. Thus the output of gate 141 remains 1 through three successive register 140 shift pulses and becomes 0 during the fourth. The output of gate 141 is combined in AND gate 145 with the output of inverters 122 and 132 and the clock signal to generate the signal on SHIFT lead SL3 shown in FIG. 4.

The output of gate 141 is also extended to AND gate 153 via inverter 142. The clock signal, as well as the outputs of inverters 122 and 132, are also extended to AND gate 153. Thus a clock pulse which does not cause a pulse to be generated on any of SHIFT leads SL1, SL2 and SL3, e.g., pulse 0 in FIG. 4, does, however, enable gate 153, thereby generating the signal on LOAD lead 54 shown in FIG. 4.

It will be appreciated that the specific embodiment of the invention shown and described herein is merely illustrative of the principles of our invention. Thus in designing a binary rate multiplier in accordance with those principles, it should be borne in mind that the input number may be divided into as many different adjacent bit groups as desired, with each bit group having any desired bit length. One need only then provide a BRM unit of appropriate input bit capability for each bit group, and apply appropriate shift and load pulses to the several BRM units in the manner taught herein.

Thus, for example, a binary rate multiplier for generating a binary rate vector in response to a six-bit input number in accordance with the invention, may comprise three BRM units each receiving a two-bit number group, as in the illustrative embodiment of FIG. 3. Or it may comprise two BRM units each receiving a three-bit input number group. Or it may comprise two BRM units, one receiving a four-bit input number group and the other a two-bit input number group.

In addition, the input number may be provided in other than binary form, e.g., in binary coded decimal form, with appropriate BRM units, shift pulses and load pulses being utilized.

Thus it is to be understood that many and varied arrangements in accordance with the principles of the invention may be devised by those skilled in the art without departing from the spirit and scope thereof.

We claim:

1. In combination, circuit means operative in response to a selected input number for generating a hierarchy of individual binary rate unit vectors substantially concurrently, each of said unit vectors being generated in response to a respective associated bit group of said input number, the position of each of said unit vectors in said hierarchy corresponding to the positional significance in said input number of the bit group associated therewith, and means for successively repeating individual unit vectors of said hierarchy and for interposing each bit of each of said unit vectors, except the highest order unit vector, substantially halfway between successive repetitions of the entire next higher order unit vector of said hierarchy, said repeating and interposing means including an output terminal and means for extending selected bits of said unit vectors to said output terminal.

2. The combination of claim 1 wherein said circuit means includes a plurality of binary rate multipliers each comprising a shift register and each operative in response to a respective one of said bit groups for generating a different one of said vectors, and wherein said extending means includes means for applying shift pulses selectively to said shift register of each of said binary rate multipliers.

3. The combination of claim 2 wherein said shift register in at least one of said binary rate multipliers comprises a recirculating shift register.

4. The combination of claim 2 wherein each of said binary rate multipliers further comprises means for loading each bit of a particular bit group into a respective predetermined number of stages of said shift register, said predetermined number corresponding to the positional significance of each said bit in said particular bit group.

5. The combination of claim 2 wherein said extending means further includes AND circuit means operative in response to said shift pulses for extending the bits of said unit vectors from said binary rate multipliers to said output terminal.

6. A binary rate multiplier comprising first circuit means responsive to a first bit group of a selected input number for providing a corresponding first binary rate vector in parallel form, second circuit means responsive to a second bit group of said input number for providing a corresponding second binary rate vector in parallel form, an output terminal, and means for repetitively extending the whole of said first vector to said output terminal in alternation with successive individual bits of said second vector.

7. The binary rate multiplier of claim 6 wherein said first circuit means includes a first shift register, and first means for generating said first binary rate vector and for loading the bits thereof into respective stages of said first shift register.

8. The binary rate multiplier of claim 7 wherein said first generating and loading means includes means for loading each bit of said first bit group into a respective predetermined number of stages of said first shift register, said predetermined number corresponding to the positional significance of each said bit in said first bit group.

9. The binary rate multiplier of claim 7 wherein said first shift register includes means for recirculating the bits of said first vector.

10. The binary rate multiplier of claim 7 wherein said second circuit means includes a second shift register and second means for generating said second binary rate vector and for loading the bits thereof into respective stages of said second shift register, and wherein said extending means includes means for shifting the bits of said first and second vectors to said output terminal from said first and second shift registers, respectively.

11. A binary rate multiplier comprising first and second shift registers, means for loadng into said first and second shift registers first and second binary rate vectors respectively, said first and second vectors respectively corresponding to first and second bit groups of a selected input number, the bits of said second bit group being of lower significance in said input number than those of sid first group, an output terminal, first means operative for shifting the whole of said first vector to said output terminal, a second means operative for shifting single successive bits of said second vector to said output terminal, and means for alternately operating said first and second shifting means.

12. The binary rate multiplier of claim 11 wherein said loading means includes means for loading each bit of said first and second bit groups into a respective predetermined number of stages of said first and second shift registers, respectively, said predetermined number corresponding to the positional significance of said each bit in the bit group thereof.

13. The binary rate multiplier of claim 12 further comprising means operative in response to the operation of said first shifting means for recirculating the bits of said first vector in said first shift register.

14. The binary rate multiplier of claim 13 wherein said first and second shifting means include OR circuit means and respective first and second AND circuit means, said first and second AND circuit means being operative in response to said first and second shifting means, respectively, for extending vector bits previously loaded into said first and second shift registers to respective inputs of said OR circuits means, the output of said OR circuit means being connected to said output terminal.

15. A method of generating a binary rate vector in response to a predetermined input number, said method comprising the steps of, generating a hierarchy of individual binary rate unit vectors substantially concurrently, each of said unit vectors being generated in response to a respective associated one of a plurality of bit groups within said input number, the position of each one of said unit vectors in said hierarchy corresponding to the positional significance in said input number of the bit group associated therewith, and successively repeating particular unit vectors of said hierarchy and interposing each bit of each of said unit vectors, except the highest order unit vector, substantially halfway between successive repetitions of the entire next higher order unit vector of said hierarchy, said repeating and interposing step including the step of extending selected bits of said unit vectors to an output terminal.

16. The method of claim 15 wherein said generating step includes the step of loading each bit of each one of said bit groups into a respective predetermined number of stages of a shift register associated with said one of said bit groups, said predetermined number corresponding to the positional significance of said each bit in said one of said bit groups.

17. The method of claim 16 wherein said extending step includes the step of applying shift pulses to the shift register associated with each of said bit groups.

18. A method for generating a binary rate vector in response to a predetermined input number, said method comprising the steps of, generating a first binary rate vector in parallel form, said first vector corresponding to a first bit group of said input number, generating a second binary rate vector in parallel form, said second vector corresponding to a second bit group of said input number, the bits of said second group being of lower significance in said input number than those of said first group, and repetitively extending the whole of said first vector to an output terminal in alternation with successive individual bits of said second vector.

19. A method of generating a binary rate vector in response to a predetermined input number, said method comprising the steps of, generating at least first, second and third binary rate vectors in response to first, second and third bit groups of said input number, said bit groups being of descending positional significance in said input number in the order named, the bits of each one of said first, second and third vectors being generated substantially concurrently with each other bit of the same vector, and repetitively applying the whole of said first vector to an output terminal in alternation with successive individual bits taken from a predetermined sequence of bits from said second and third vectors, the bits of said third vector alternating in said sequence with the whole of said second vector.

* * * * *